(12) United States Patent
Cheng et al.

(10) Patent No.: US 11,762,318 B2
(45) Date of Patent: Sep. 19, 2023

(54) AUTOMATIC DETECTION METHOD FOR PAPER SIZE

(71) Applicant: CAL-COMP ELECTRONICS & COMMUNICATIONS COMPANY LIMITED, New Taipei (TW)

(72) Inventors: Yung-Sen Cheng, New Taipei (TW); Tzu-Cheng Chang, New Taipei (TW)

(73) Assignee: CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 123 days.

(21) Appl. No.: 17/548,867

(22) Filed: Dec. 13, 2021

(65) Prior Publication Data

US 2023/0102783 A1    Mar. 30, 2023

(30) Foreign Application Priority Data

Sep. 28, 2021   (CN) .......................... 202111143420.1

(51) Int. Cl.
*B65H 43/00*       (2006.01)
*G03G 15/00*       (2006.01)

(52) U.S. Cl.
CPC ......... *G03G 15/5029* (2013.01); *B65H 43/00* (2013.01); *B65H 2515/10* (2013.01); *G03G 2215/00742* (2013.01)

(58) Field of Classification Search
CPC ..... G03G 15/5029; G03G 2215/00742; B65H 43/00; B65H 2515/10; B65H 2511/10; B65H 2801/06; B65H 2801/39; H04N 1/00708
See application file for complete search history.

(56) References Cited

U.S. PATENT DOCUMENTS 6,661,933 B1 *  12/2003  Hisatomi ........... H04N 1/00708
                                                      382/209

FOREIGN PATENT DOCUMENTS

JP    2003219117 A    7/2003
JP    2009171429 A    7/2009

OTHER PUBLICATIONS

Office Action dated Feb. 14, 2023 of the corresponding Japan patent application No. 2021-205430.

* cited by examiner

*Primary Examiner* — Tony Ko
(74) *Attorney, Agent, or Firm* — Chun-Ming Shih; HDLS IPR SERVICES

(57) ABSTRACT

An automatic detection method for a paper size is disclosed. a plurality of mark points is set on a paperweight along a paperweight direction that is different from a feeding direction. The disclosure senses a plurality of row images combining into a scan image during a paper passing between the paperweight and an image sensor, determines an edge length of the paper based on a range of the mark points covered by the paper, and determines a paper size based on the edge length. The disclosure can effectively detect the paper size without any additional sensors.

19 Claims, 18 Drawing Sheets

AUTOMATIC DETECTION METHOD FOR PAPER SIZE

BACKGROUND OF THE DISCLOSURE

Technical Field

The technical field relates to a size detection method and more particularly relates to an automatic detection method for a paper size.

Description of Related Art

The automatic detection method for paper size of the related art acquires a paper size through a paper size detector arranged in a feeding device.

Hardware cost and maintenance fee of the automatic detection method for paper size of the related art increase because of the arrangement of the paper size detector. Moreover, an available feeding space is occupied and reduced because the paper size detector must be arranged in the feeding space for detecting the correct paper size, and the arrangement of the paper size detector increases the difficulty of hardware installation and hardware design as well.

Thus, the automatic detection method for paper size of the related art has above-mentioned problems, there is a need for a more effective solution.

SUMMARY OF THE DISCLOSURE

The disclosure is directed to an automatic detection method for paper size having an ability to calculate a paper size through image analysis without any additional paper size detector.

In one of the embodiments, an automatic detection method for a paper size is disclosed. A plurality of mark points is set on a paperweight along a paperweight direction that is different from a feeding direction. The method comprises: a) acquiring a scan image comprising a plurality of row images in continuous by controlling an image sensor to continuously sense the mark points of the paperweight during a paper passing between the paperweight and the image sensor; b) determining a first edge length of the paper based on a coverage zone of the paper covering the mark points in the row images; and, c) determining the paper size of the paper based on the first edge length.

The disclosure can effectively detect the paper size without any additional sensors.

BRIEF DESCRIPTION OF THE DRAWINGS

The features of the present disclosure are believed to be novel are set forth with particularity in the appended claims. The present disclosure itself, however, may be best understood by reference to the following detailed description of the present disclosure which describes an exemplary embodiment of the present disclosure, taken in conjunction with the accompanying drawings, in which:

DETAILED DESCRIPTION OF THE EMBODIMENTS

The technical contents of this disclosure will become apparent with the detailed description of embodiments accompanied with the illustration of related drawings as follows. It is intended that the embodiments and drawings disclosed herein are to be considered illustrative rather than restrictive.

The present disclosure is to disclose an automatic scanning apparatus and an automatic detection method for a paper size thereof. The present disclosure may set multiple mark points on a paperweight, such that a partial of the mark points is covered by a paper during the paper passing between an image sensor and the paperweight. The present disclosure may determine a paper size of the paper via executing an image analysis on a coverage zone of the paper covering the partial of the mark points.

Figure 1:
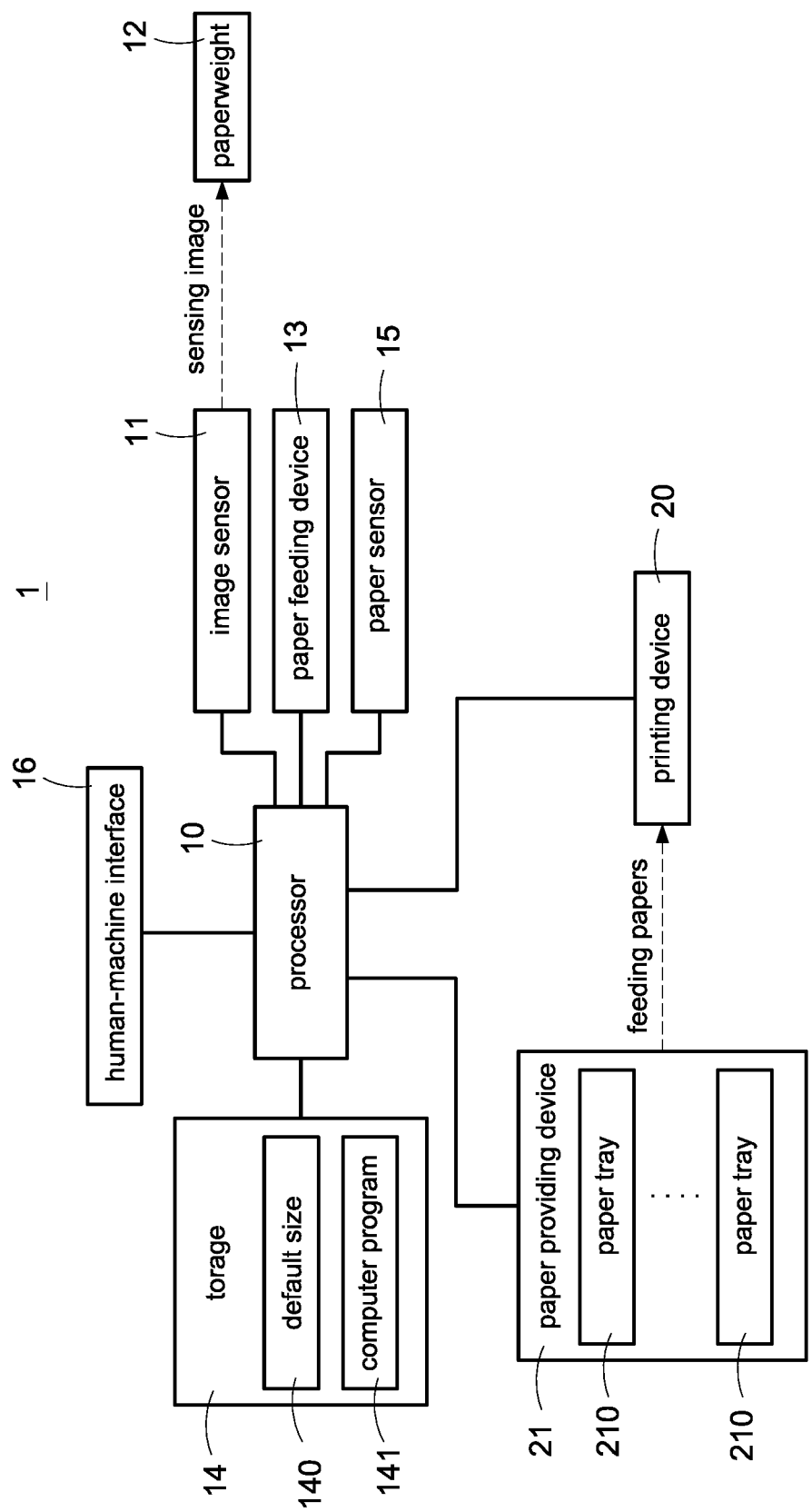
FIG. 1 is an architecture diagram of an automatic scanning apparatus of one embodiment of the present disclosure.

Please refer to FIG. 1, FIG. 1 is an architecture diagram of an automatic scanning apparatus of one embodiment of the present disclosure. The automatic scanning apparatus 1 of the present disclosure mainly includes an image sensor 11, an automatic feeding module, and a processor 10.

The automatic feeding module may be used to feed in/out papers, and include a paperweight 12 and a paper feeding device 13. The paperweight 12 may be used to flatten each paper to be scanned to make each paper flatten and close to the image sensor 11, so as to improve a quality of a scan image generated by the image sensor 11. Moreover, a weight of the paperweight 12 and a gap width between the paperweight 12 and the image sensor 11 may be determined based on the available paper sizes and the available paper thicknesses. The paper feeding device 13 may be a combination of a motor (such as a stepping motor), a gear set, and a paper feeding roller. For scanning, the paper feeding device 13 may be used to convey each paper from a starting point (e.g., a feed-in paper tray) to a position between the image sensor 11 and the paperweight 12, and convey a scanned paper to a destination (e.g., a feed-out paper tray).

The image sensor 11, e.g., CCD image sensor, CMOS image sensor, or other types of contact image sensors, may capture the paper to obtain a scan image correspondingly.

In one of the embodiments, an area of a sensing zone of the image sensor 11 may be less than an area of the paper.

In one of the embodiments, a width of the sensing zone of the image sensor 11 is longer than a width (the shortest edge length) of the paper, and a length of the sensing zone is shorter than a length (the longest edge length) of the paper. More specifically, for obtaining a complete scan image, the image sensor 11 is configured to scan different rows of the paper in continuous to obtain a plurality of consecutive row images, and splice the row images in a sequence to obtain the scan image.

The processor 10, e.g., MCU, CPU, SoC, DSP, FPGA, or other types of programmable processors, may be electrically connected to the image sensor 11 and the automatic feeding module. In the present disclosure, the processor 10 is configured to execute a paper size detection on the image(s) captured by the image sensor 11 to determine the paper size of the paper being fed.

In one of the embodiments, the automatic scanning apparatus 1 may include a storage 14 electrically connected to the processor 14. The storage 14 may be any combination of a RAM, a ROM, an EEPROM, a flash memory, and other types of memory. The storage 14 is used to store data.

In one of the embodiments, the storage 14 may pre-store a plurality of default sizes 140. The above-mentioned default sizes 140 are the paper sizes available to the automatic scanning apparatus 1. For example, the automatic scanning apparatus 1 is able to recognize and/or scan the paper with the default size 140.

In one of the embodiments, the automatic scanning apparatus 1 may include a paper sensor 15 electrically connected to the processor 10. The paper sensor 15 may be a photoelectric sensor or a shielded sensor. The paper sensor 15 may be arranged in a feeding route (e.g., on an origin and/or a destination of the feeding route) to sense whether any paper is fed in/out.

In one of the embodiments, the automatic scanning apparatus 1 may include a human-machine interface 16 electrically connected to the processor 10. The human-machine interface 16 may be any combination of an indicator light, a buzzer, a keypad, a display, a touch screen, or other types of input/out device. The human-machine interface 16 is used to receive user operations and provide information.

In one of the embodiments, the automatic scanning apparatus 1 may include a network interface (not shown in the FIGS.). The network interface may be a Bluetooth module, a Wi-Fi module, a wired Ethernet module, or other types of network interfaces. The network interface is used to connect to an external computer (e.g., a server or a computer device of a user) through a network, such that the automatic scanning apparatus 1 may be controlled by the external computer, or transmit data to the external computer. For example, the scan image may be transmitted to the external computer through the network interface.

In one of the embodiments, the automatic scanning apparatus 1 may implement a copy function and a print function, and include a paper providing device 20 and a printing device 21 electrically connected to the processor 10. The paper providing device 20 may include one or more paper trays 210. The paper trays 210 may be used to respectively provide print papers with different default sizes 140. The printing device 20 (e.g., an inkjet printing module, a laser toner printing module, etc.) is used to perform printing on the print paper.

In one of the embodiments, for copying the paper, the automatic scanning apparatus 1 may select one of the paper trays 210 corresponding to the paper size of the paper being detected during scanning to provide the print paper with the paper size, and print the scan image on the print paper in proportion through the printing device 20.

Figure 2:
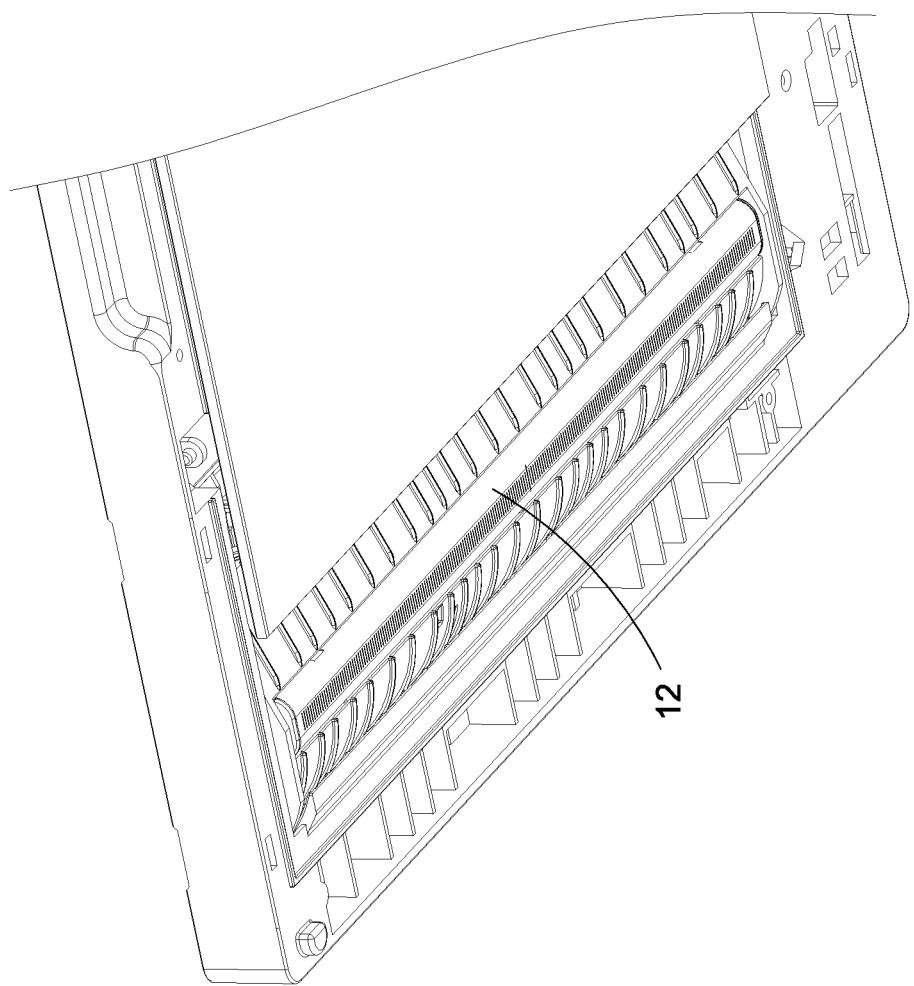
FIG. 2 is a schematic view of an arrangement of a paperweight of one embodiment of the present disclosure.
Figure 3:
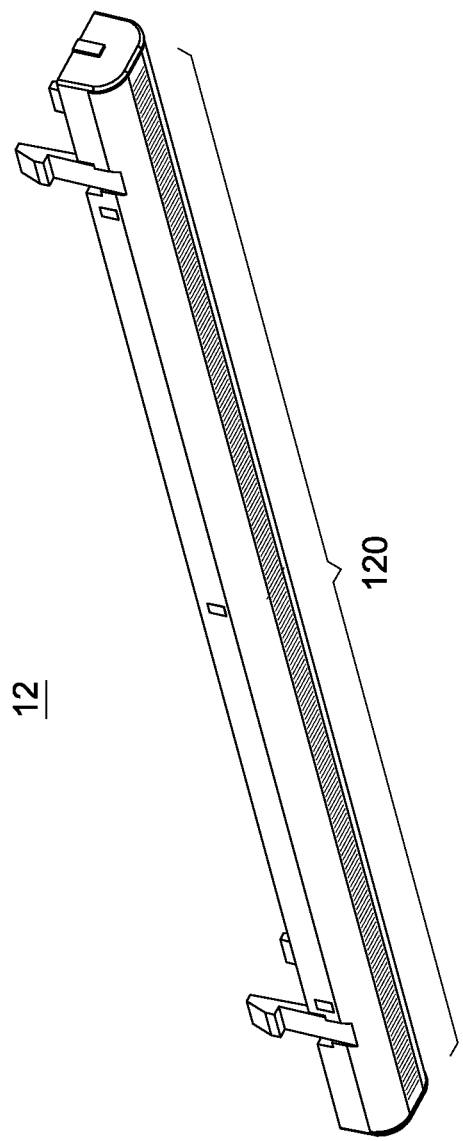
FIG. 3 is a schematic view of an appearance of a paperweight of one embodiment of the present disclosure.
Figure 4:
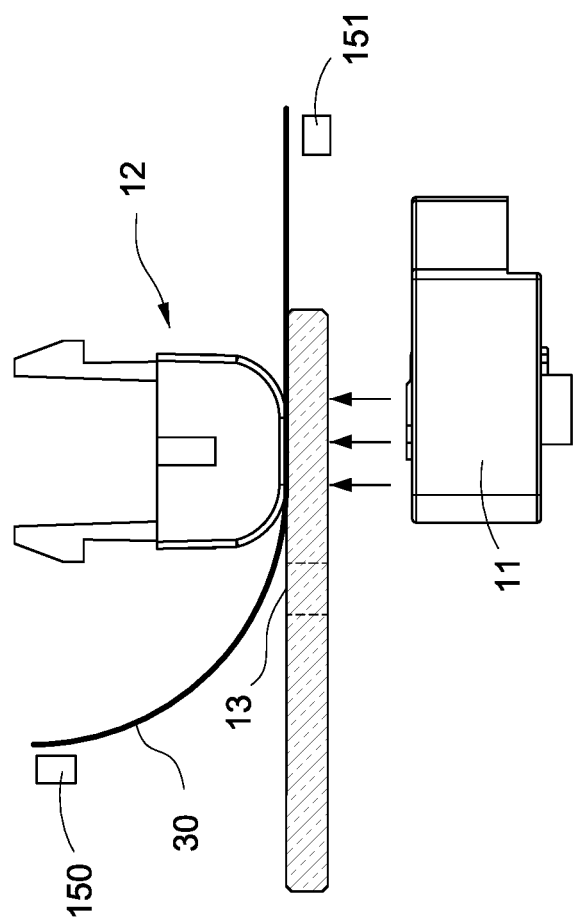
FIG. 4 is a schematic view of feeding and scanning of one embodiment of the present disclosure.

Please refer to FIGS. 2-4, wherein FIG. 2 is a schematic view of an arrangement of a paperweight of one embodiment of the present disclosure, FIG. 3 is a schematic view of an appearance of a paperweight of one embodiment of the present disclosure, and FIG. 4 is a schematic view of feeding and scanning of one embodiment of the present disclosure.

As shown in FIG. 2, the automatic feeding module including the paperweight 12 may be arranged on a printer or other apparatus with paper feeding requirement.

In this embodiment, the paperweight 12 is arranged above the image sensor 11, and is set with a plurality of mark points 120 along a paperweight direction. In an embodiment shown in FIG. 3, the mark points 120 form an equidistant dotted line. The above-mentioned paperweight direction is different from the feeding direction. In an embodiment shown in FIG. 4, the paperweight direction is perpendicular to the feed direction.

As shown in FIG. 4, the image sensor 11 executes an image-sensing to the mark points 120 of the paperweight 12 from the bottom of the paperweight 12 toward the top of the paperweight 12. This specific example is not intended to limit the scope of the present disclosure. In other embodiments, the orientation of the image sensor 11 and the paperweight 12 may be arbitrarily modified based on the requirements. A paper 30 covers a partial of the mark points 120 when the paper 30 passes through a middle position between the image sensor 11 and the paperweight 12. Thus, the captured row images and a scan image including these row images (as shown in FIGS. 15-18) clearly show a coverage zone of the mark points being covered in each scanning time series. The present disclosure may detect the paper size of the paper 30 via analyzing the above-mentioned coverage zone.

Figure 12:
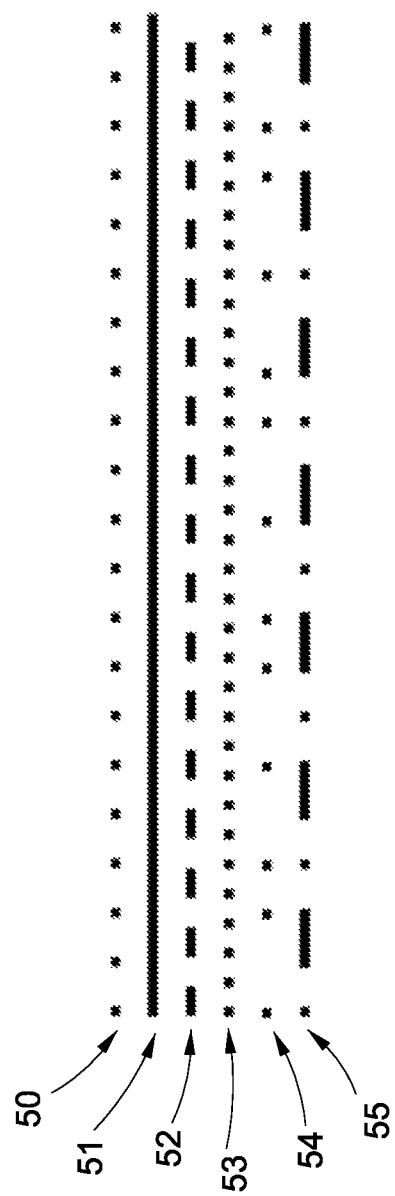
FIG. 12 is a schematic view of an appearance of multiple mark points of one embodiment of the present disclosure.

Please refer to FIG. 12, FIG. 12 is a schematic view of an appearance of multiple mark points of one embodiment of the present disclosure. The mark points 120 set on the paperweight 12 form one or more parallel mark lines, e.g., straight lines or dashed lines. Moreover, multiple mark lines may be same type or different types when the multiple mark lines are set on the paperweight 12.

FIG. 12 shows six types of mark lines 50-55. The mark lines 50-55 respectively provide different recognition accuracies.

The mark line 50 is an equidistant dotted line whose mark points are dots. Moreover, all of the mark intervals between any two adjacent mark points in the paperweight direction of the mark line 50 are the same.

The mark line 51 is a straight line with a mark interval being zero.

The mark line 52 is an equidistant dotted line whose mark points are segments. Moreover, all of the mark points in the paperweight direction have the same segment length.

The mark line 53 is an equidistant dotted line similar to the mark line 50, but has a mark interval (e.g., 0.5 mm) less than the mark interval of the mark line 50 (e.g., 1 mm), such that the mark line 53 is able to provide a higher accuracy in comparison with the mark line 50.

The mark line 54 is a non-equidistant dotted line whose mark points are dots. The mark line 54 has two different types of mark intervals, e.g., 1 mm and 2 mm.

The mark line 55 is an equidistant dotted line having two different types of mark points, e.g., dots and segments.

In one of the embodiments, the mark interval and the segment length above-mentioned may be adjusted based on the default sizes to be recognized and the accuracy to be required.

In one of the embodiments, each default size includes different default edge lengths, e.g., a default length and a default width. Moreover, a minimum mark interval of the mark line is less than a difference of two default edge lengths of any two of the default sizes.

For example, a first default size is A4 (having the dimension of 210 mm×297 mm) and a second default size is B4 (having the dimension of 250 mm×353 mm). The mark interval must be less than a minimum edge difference 40 mm of the two default sizes, such that the two edge lengths 210 mm and 250 mm of the first default size and the second default size may be recognized due to the number of the mark points covered by the paper.

In one of the embodiments, the mark interval may be shorter than 5 mm, e.g., 1 mm, such that a better detection accuracy is provided.

In one of the embodiments, a length of each mark line composed of multiple mark points may be longer than all of the default edge lengths of the default sizes. Thus, the coverage zone may be prevented from undetectable caused by the mark line being fully hidden by the scanned paper.

Please be noted that the above-mentioned six types of mark lines 50-55 are only used to illustrate partial embodiments of the present disclosure, and don't limit the types of mark lines that may be used in the present disclosure. Other types of mark lines may be used by the present disclosure, such as different mark point type configurations, different mark interval configurations, different mark length configurations, or any combination of the above configurations.

Figure 5:
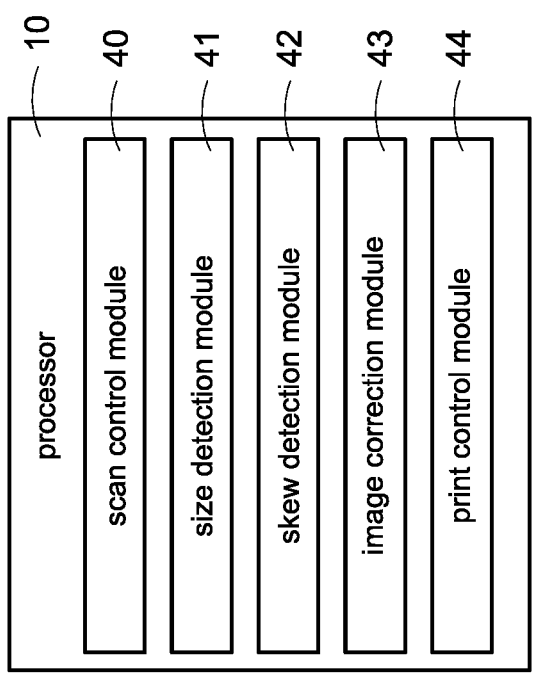
FIG. 5 is an architecture diagram of a processor of one embodiment of the present disclosure.

Please refer to FIG. 5, FIG. 5 is an architecture diagram of a processor of one embodiment of the present disclosure. In one of the embodiments, the processor 10 may include a scan control module 40, a size detection module 41, a skew detection module 42, an image correction module 43, and a print control module 44. These modules 40-44 are configured to implement different functions respectively.

The scan control module 40 is used to control the image sensor 11 to execute the image-sensing.

The size detection module 41 is used to detect the paper size of the scanned/fed paper.

The skew detection module 42 is used to detect a skew angle of the scanned/fed paper.

The image correction module 43 is used to correct an orientation of the scan image based on the skew angle.

The print control module 44 is used to control the paper providing device 21 and the printing device 20 to print.

The above-mentioned modules 40-44 are connected to each other (such as by electrical connections or information links), and any one of the modules 40-44 may be a hardware module (such as an electronic circuit module, an integrated circuit module, or an SoC, etc.), a software module (such as firmware, an operating system, or an application program), or a combination of the hardware module and the software module, and this example is not intended to limit the scope of the present disclosure.

Please be noted that when one of the above-mentioned modules 40-44 is the software module such as firmware, an application program, or an operating system, the storage 14 may include a non-transitory computer-readable media (not shown in FIGS.). The non-transitory computer-readable media stores a computer program 141. The computer program 141 records computer-readable codes. When the processor 10 executes the above computer-readable codes, the functions of the modules 40-44 may be achieved correspondingly.

Figure 6:
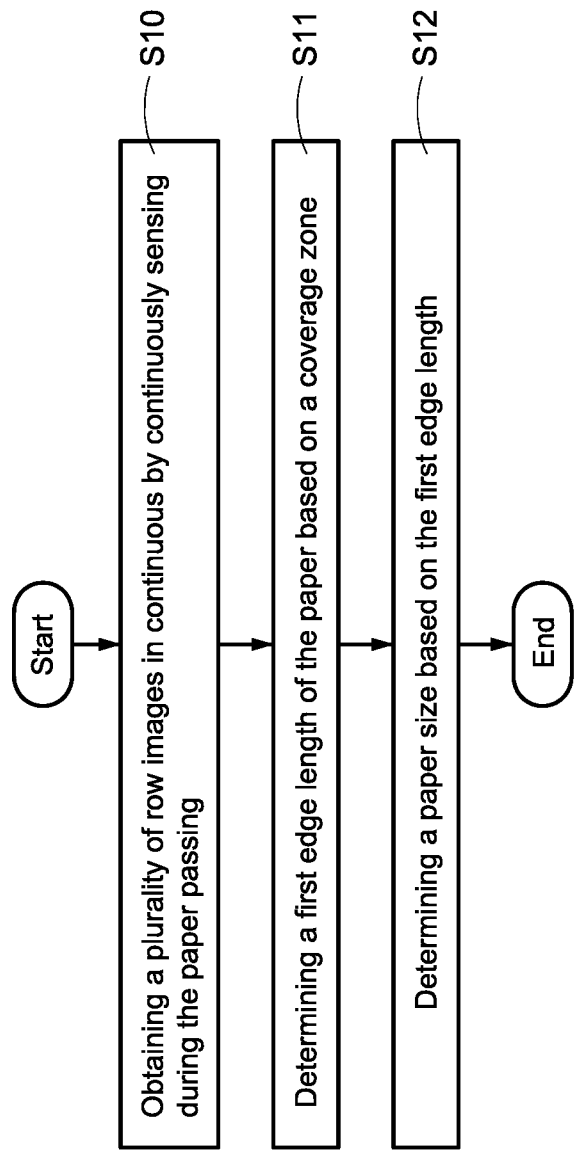
FIG. 6 is a flowchart of an automatic detection method of one embodiment of the present disclosure.

Please refer to FIG. 6, FIG. 6 is a flowchart of an automatic detection method of one embodiment of the present disclosure. The automatic detection method of each embodiment of the present disclosure may be implemented by the automatic scanning apparatus 1.

The automatic scanning apparatus 1 starts to execute the automatic detection method when a paper is fed in.

In step S10, the processor 10 controls the image sensor 11 through the scan control module 40 to continuously sense toward the mark points of the paperweight 12 to obtain a plurality of row images in continuous during the paper passing through a middle position between the paperweight 12 and the image sensor 11. The above-mentioned row images may be combined into a scan image of the paper being fed in and scanned.

The processor 10 performs steps S11-S12 at the same time as performing step S10 or after the step S10 had been performed.

In step S11, the processor 10 recognizes a coverage zone of the paper covering the mark points 120 in the row images through the size detection module 41, and determines a first edge length of the paper based on the coverage zone.

In one of the embodiments, the processor 10 may recognize a mark number of the mark points 120 covered by a zone between a plurality of vertexes of the paper (e.g., two vertexes of a top edge of the paper) in a paperweight direction, and estimate the first edge length of the paper in the paperweight direction base on a mark interval and the mark number of the covered mark points 120.

In one of the embodiments, the processor 10 may execute a positioning process on the two vertexes of a top edge or a bottom edge of the paper to determine coordinates of the two vertexes based on multiple positions of the mark points 120 covered by the paper, and determine the first edge length of the top edge or the bottom edge based on the coordinates of the two vertexes.

In step S12, the processor 10 determines a paper size of the paper through the size detection module 41 based on the first edge length determined in step S11.

TABLE 1

| default sizes (mm) | | | |
|---|---|---|---|
| Legal (LG) | | 261*356 | |
| Letter (LT) | | 219.5*279.4 | |
| A4 | 210*297 | B4 | 250*353 |
| A6 | 105*148 | B6 | 125*176 |

Please refer to table 1, table 1 is a default size table of one embodiment of the present disclosure. The unit of the number shown in table 1 is millimeter (mm). In this embodiment, the automatic scanning apparatus 1 may recognize the six sizes shown in table 1.

The automatic scanning apparatus 1 may determine one of the default sizes of the paper when the first edge length of the paper is detected because the default edge lengths of the above six default sizes are different from each other.

For example, if the first edge length is 210 mm, the automatic scanning apparatus 1 determines that a size of the paper is the default size of A4. If the first edge length is 176 mm, the automatic scanning apparatus 1 determines that a size of the paper is the default size of B6. If the first edge length is 215 mm (namely, there is no default edge length consistent with the first edge length), the automatic scanning apparatus 1 determines that a size of the paper is the default size of Letter having a closest default edge length (219.5 mm), and so on.

Thus, the present disclosure may use the existed image sensor 11 to detect the paper size of the paper effectively, and don't need any additional paper size detector.

Figure 7:
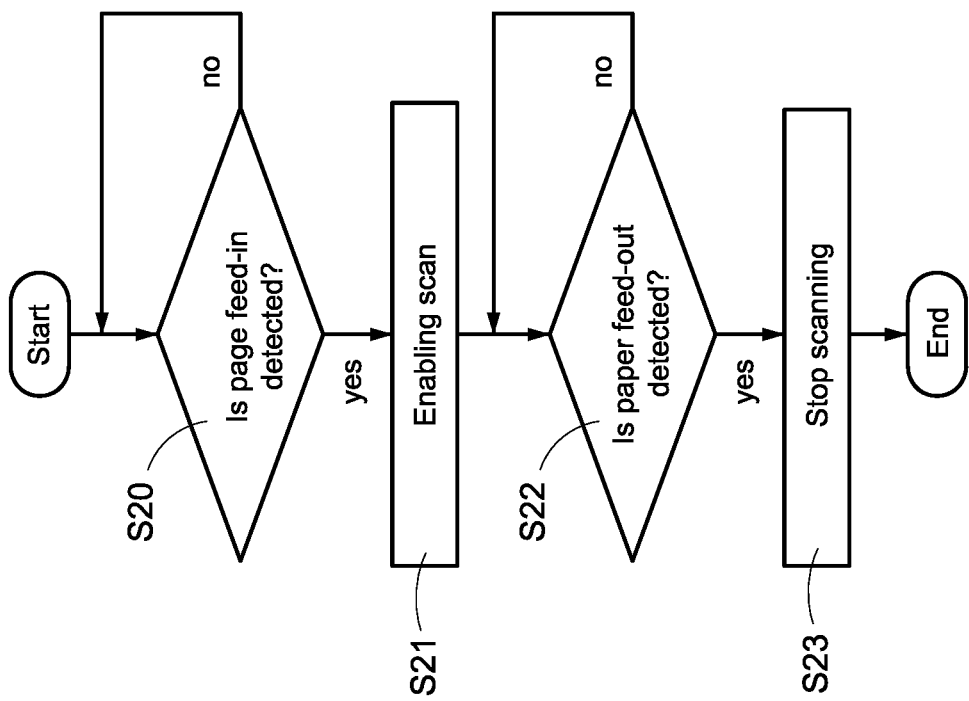
FIG. 7 is a flowchart of automatic scanning of one embodiment of the present disclosure.

Please refer to FIGS. 6 and 7, wherein FIG. 7 is a flowchart of automatic scanning of one embodiment of the present disclosure. In comparison with the automatic detection method shown in FIG. 6, an automatic detection method shown in FIG. 7 further includes steps S20-S23 for implementing a function of automatically detecting feeding papers.

In step S20, the processor 10 detects whether a paper is fed in through the scan control module 40.

In one of the embodiments, the processor 10 controls the image sensor 11 to start sensing when a default sensing condition is met. Namely, the image sensor 11 is controlled to start scanning the fed paper when the default sensing condition is met.

In one of the embodiments, the above-mentioned sensing condition may be met either when the page feed-in sensor 15 is triggered, when a scan command is received, when a scan operation is received, or when the paper feeding device 13 is pushed by the paper, etc. This specific example is not intended to limit the scope of the present disclosure.

Step S21 is performed when the paper is detected to be fed in. Otherwise, step S20 is performed again for continuous detection.

In step S21, the processor 10 controls the paper feeding device 13 through the scan control module 40 to first convey the paper to a middle position between the image sensor 11 and the paperweight 12, and then convey the paper to a feeding-out paper tray. At the same time, the processor 10 controls the image sensor 11 to capture each part of the paper passing through a sensing zone of the image sensor 11 to obtain the row images in continuous corresponding to multiple continuous image blocks of the paper. These row images may be spliced into the scan image of the paper. The coordination between a shooting rate of the image sensor 11 and a feeding speed of the paper feeding device 13 is omitted for brevity.

In step S22, the processor 10 detects whether any paper is fed out through the scan control module 40. For example, the processor 10 detects whether the paper has fully passed through the image sensor 11 and arrived at the feeding-out paper tray.

In one of the embodiments, the processor determines that the paper has been fed out either when the paper sensor 15 is triggered again, when a complete command is received, when a complete operation is received, or when the captured row image doesn't include any paper.

In one of the embodiments, after the scan starts, the processor 10 continuously detects whether the mark points in each row image are covered, and determines that the paper has been fed out when all of the mark points in same row image or in several continuous row images are not covered.

Please refer to FIG. 4, in one of the embodiments, the paper sensor 15 includes a page feed-in sensor 150 and a page feed-out sensor 151. The paper is conveyed along a feeding route. Moreover, the paper passes through the page feed-in sensor 150, the image sensor 11, and the page feed-out sensor 151 in order. Thus, the processor 10 may determine that the paper is fed in when the page feed-in sensor 150 is triggered, and determine that the paper is fed out when the page feed-out sensor 151 is triggered.

The automatic scanning apparatus 1 executes step S23 when it is detected that the paper feeding is completed. Otherwise, the automatic scanning apparatus 1 scans and performs the step S22 again for continuous detection.

In step S23, the processor 10 controls the paper feeding device 13 to stop feeding through the scan control module 40, and controls the image sensor 11 to stop sensing at the same time.

Thus, the present disclosure may achieve an automatic detection of paper feeding in/out.

Figure 8:
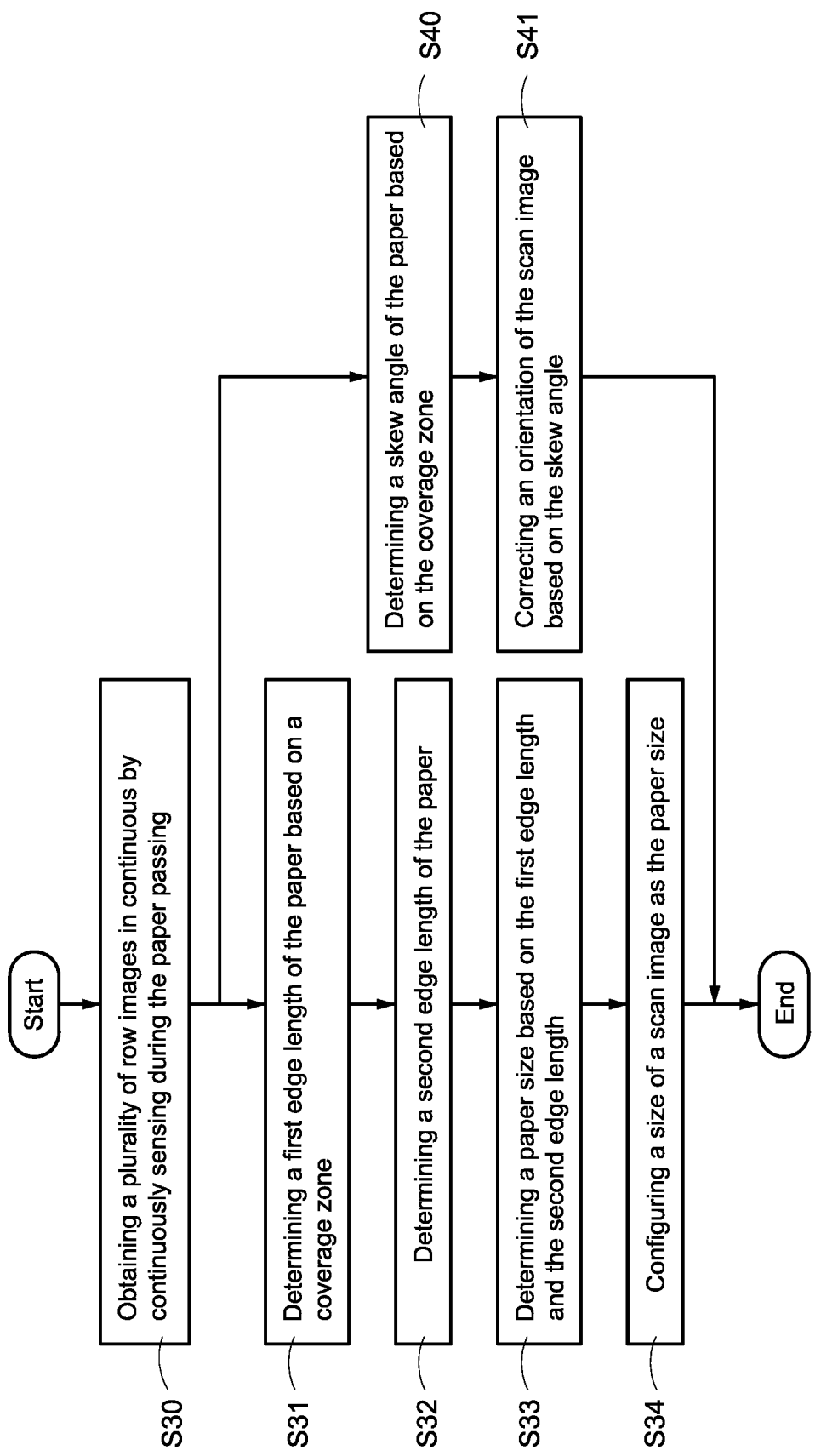
FIG. 8 is a flowchart of an automatic detection method of one embodiment of the present disclosure.

Please refer to FIGS. 6-8, wherein FIG. 8 is a flowchart of an automatic detection method of one embodiment of the present disclosure. In comparison with the automatic detection method of FIG. 6, an automatic detection method of FIG. 8 further performs steps S30-S34 to acquire two edge lengths of the paper for detecting the paper size more accurately.

The steps S30 and S31 are first performed to acquire the first edge length of the paper. The steps S30-S31 are the same as or similar to the steps S10-S11, the relevant description is omitted for brevity.

In step S32, the processor 10 determines a second edge length of the paper through the size detection module 41 after the paper is fully scanned. Moreover, the second edge length corresponds to the feeding direction.

In one of the embodiments, the processor 10 may recognize a coverage zone in the scan image, and calculate the second edge length based on a length in the feeding direction of the coverage zone.

In one of the embodiments, the processor 10 may acquire a motor step number of a stepping motor of the paper feeding device 13. The motor step number may be acquired through an encoder in the stepping motor. The motor step number is counted during the mark points 120 are covered by the paper. For example, a counting of the motor step number starts when the paper enters the sensing zone of the image sensor 11, and stops when the paper leaves the sensing zone. Then, the processor 10 may calculate the second edge length based on the motor step number and a conversion ratio. For example, the conversion ratio means an actual distance of the paper being fed per motor step. A length in the feeding direction of the coverage zone may be calculated through multiplying the motor step number by the conversion ratio. The length in the feeding direction of the coverage zone may be calculated to be the second edge length.

In one of the embodiments, the processor 10 may execute a coordinate positioning on two vertexes of any side edge of the paper to determine two coordinates of the two vertexes when the two vertexes of the coverage zone are recognized, and calculate a distance between the two coordinates to be the second edge length.

In one of the embodiments, the above-mentioned coordinates may include a first axis coordinate corresponding to the paperweight direction and a second axis coordinate corresponding to the feeding direction. For example, when the X-Y coordinates system is applied, the first axis may be the X-axis, the second axis may be the Y-axis. This specific example is not intended to limit the scope of the present disclosure.

In one of the embodiments, the first axis may be the Y-axis, the second axis may be the X-axis.

In one of the embodiments, in the coordinate positioning, the present disclosure may calculate the first axis coordinate based on a default mark interval and the mark number of the mark points between the two vertexes. Taking 400 mark points and a mark interval of 1 mm as an example, if a vertex is located at a fifth mark point, the first axis coordinate of the vertex may be configured as 5. If a vertex is located at a 297th mark point, the first axis coordinate of the vertex may be configured as 297, and so on.

In one of the embodiments, in the coordinate positioning, the present disclosure may calculate the second axis coordinate based on the motor step number and a conversion ratio. Taking 0.5 mm per step for an example, if a vertex is captured in the tenth step of the motor step number, the second axis coordinate may be 5 (10 steps×0.5 mm). If a vertex is captured in the 490th step of the motor step number, the second axis coordinate may be 245 (490 steps× 0.5 mm), and so on.

Thus, the present disclosure may determine the coordinates of all of the vertexes of the coverage zone via the above-mentioned method. Moreover, after the coordinates of all of the vertexes are acquired, the present disclosure may execute an image process on a region of interest of the scan image based on the coordinates. The image process may be rotation, correction, or adjustment of image parameters, etc. The above-mentioned region of interest may be a zone encompassed by all vertexes. Namely, the region of interest may be an image zone of the paper.

In step S33, the processor 10 determines the paper size of the paper through the size detection module 41 based on the determined first edge length and the determined second edge length.

In step S34, the processor 10 configures a size of the scan image as the paper size through the scan control module 40.

Thus, the scan image may be opened or printed with a correct size.

In one of the embodiments, the processor 10 may select one of the default sizes having the default edge lengths most consistent with the first edge length and the second edge length as the paper size. For example, a length different ratio of any of the first edge length and the second edge length and any of the default edge lengths of the selected default size may be lower than 10%.

The present disclosure may determine a default size corresponding to the paper based on the first edge length and the second edge length simultaneously, and multiple default sizes may be recognized by the present disclosure.

Figure 9:
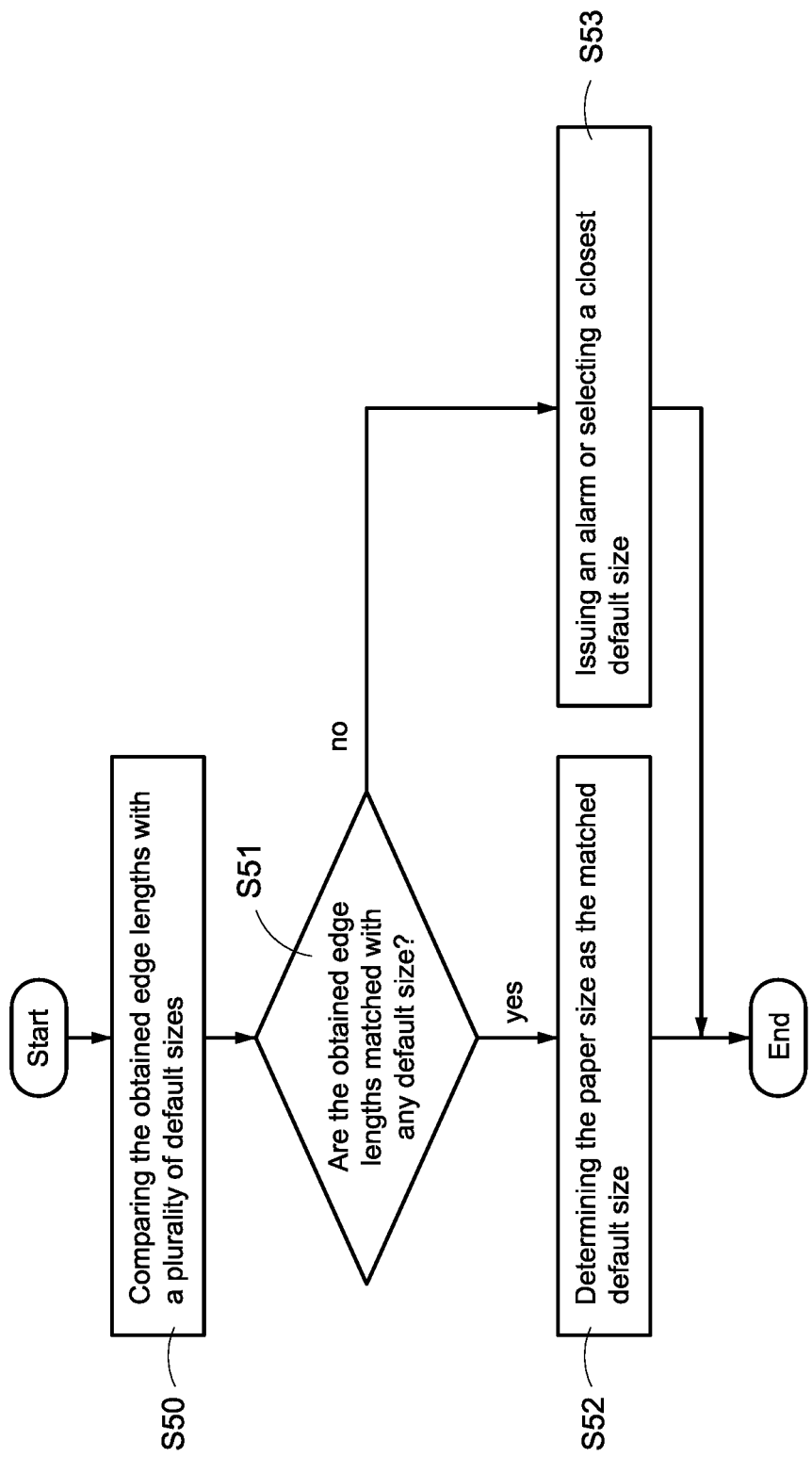
FIG. 9 is a flowchart of size detection of one embodiment of the present disclosure.

Please refer to FIGS. 6-9, wherein FIG. 9 is a flowchart of size detection of one embodiment of the present disclosure. In comparison with the step S12 of FIG. 6 and the step S33 of FIG. 8, the automatic detection method of FIG. 9 further includes steps S50-S53 for achieving multiple sizes detection.

In step S50, the processor 10 compares the obtained edge length(s) (the first edge length and/or the second edge length) with all of the default edge lengths of the recognizable default sizes one by one through the size detection module 41.

In step S51, the processor 10 determines, through the size detection module 41, whether the two obtained edge lengths are matched with the two default lengths of any of the default sizes to determine whether the paper size of the paper is matched with any of the default sizes.

When the paper size is matched with any default size, step S52 is performed. In the step S52, the processor 10 determines that the paper size is the matched default size through the size detection module 41.

When the paper size is not matched with all of the default size, step S53 is performed. In the step S53, the processor 10 controls the human-machine interface 16 to issue an unrecognizable size alarm or selects one of the default sizes closest to the obtained edge lengths as the paper size through the size detection module 41.

In one of the embodiments, when no matched default size is detected, and the length different ratio of the two obtained edge lengths and the two default edge lengths of any of the default sizes is lower than 10%, the processor 10 selects a closest one of the default sizes as the paper size, so as to put the paper production errors under consideration. When the length different ratios of the two obtained edge lengths and the two default edge lengths of all of the default sizes are higher than 10%, the processor may directly issue the unrecognizable size alarm.

TABLE 2

| default sizes (mm) | | | |
|---|---|---|---|
| A3 | 297*420 | B3 | 353*500 |
| | LD | | 279.4*431.8 |
| | Legal (LG) | | 261*356 |
| | Letter (LT) | | 219.5*279.4 |
| | ST-R | | 139.7*215.9 |
| A4 | 210*297 | B4 | 250*353 |
| A5 | 148*210 | B5 | 176*250 |
| A6 | 105*148 | B6 | 125*176 |

Please refer to table 2, which is a default size table of one embodiment of the present disclosure. The unit of the number shown in table 2 is millimeter (mm). In this embodiment, the automatic scanning apparatus 1 may recognize the twelve default sizes shown in table 2. Moreover, a partial of the default sizes one identical default edge length. For example, a short edge length of the default size of A3 is identical to a long edge length of the default size of A4, and a short edge length of the default size of B4 is identical to a long edge length of the default size of B5. The above situation makes it impossible to correctly detect the corresponding default size by only acquiring the first edge length of the paper.

To solve the above problem, the present disclosure executes the size detection by referring to the second edge length. The above twelve default sizes are respectively corresponding to different sets of default edge lengths. The present disclosure may determine, by the automatic scanning apparatus 1, a set of the default edge lengths corresponding to the paper after detecting the first edge length and the second edge length of the paper, and then determine one of the default sizes of the determined set of the default edge lengths for the paper.

For example, if the two obtained edge lengths of the paper are 148 mm and 210 mm, the paper size of the paper being fed is the default size of A5. If the two obtained edge lengths are 125 mm and 176 mm, the paper size of the paper being fed is the default size of B6. If the two obtained edge lengths are 261 mm and 356 mm (namely, there is no default edge lengths consistent with the two obtained edge lengths), the automatic scanning apparatus 1 may determine that the paper size of the paper being fed is the default size of Legal having the closest set of default edge lengths (161 mm and 356 mm), and so on.

Please refer to FIG. 8, the automatic detection method of FIG. 8 further provides a skew detection function (steps S40-S41) having an ability to detect a skew angle of the paper and to correct the scan image automatically and correspondingly.

In step S40, the processor 10 executes a skew detection process on the coverage zone of the scan image to determine the skew angle relative to the feeding direction or the paperweight direction through the skew detection module 42.

In one of the embodiments, the above-mentioned skew detection process includes: executing a coordinate positioning on the vertexes (such as positioning two vertexes of the edge, three vertexes or four vertexes of the edges) of the coverage zone based on the mark number of the mark points in the coverage zone to obtain coordinates of the vertexes; and calculating the skew angle between a connection of the vertexes and one of the feeding direction and the paperweight direction.

In one of the embodiments, the above-mentioned skew detection process includes: recognizing the two vertexes of the top edge, the bottom edge or the side edge of the coverage zone; calculating a first offset of the two vertexes in the feeding direction and a second offset of the two vertexes in the paperweight direction; and calculating the skew angle of a connection of the two vertexes and one of the feeding direction and the paperweight direction through the first offset and the second offset based on a trigonometric function calculation. The above-mentioned first offset may be calculated based on the mark interval and the mark number of the mark points between the two vertexes. The above-mentioned second offset may be calculated based on the conversion ratio and the motor step number counted between the two vertexes.

In step S41, the processor 10 corrects an orientation of the scan image based on the skew angle through the image correction module 43.

In one of the embodiments, the automatic detection method further provides a copy function having the ability to print the scan image proportionally. More specific, when the paper size is determined and the orientation of the scan image is corrected, the processor 10 may select one of the paper trays 210 (e.g., selecting the paper tray 210 corresponding to the paper size) to convey the print paper to the print device 20 through the print control module 44 based on the paper size, and control the print device 20 to print the scan image on the print paper proportionally based on the paper size.

Figure 10:
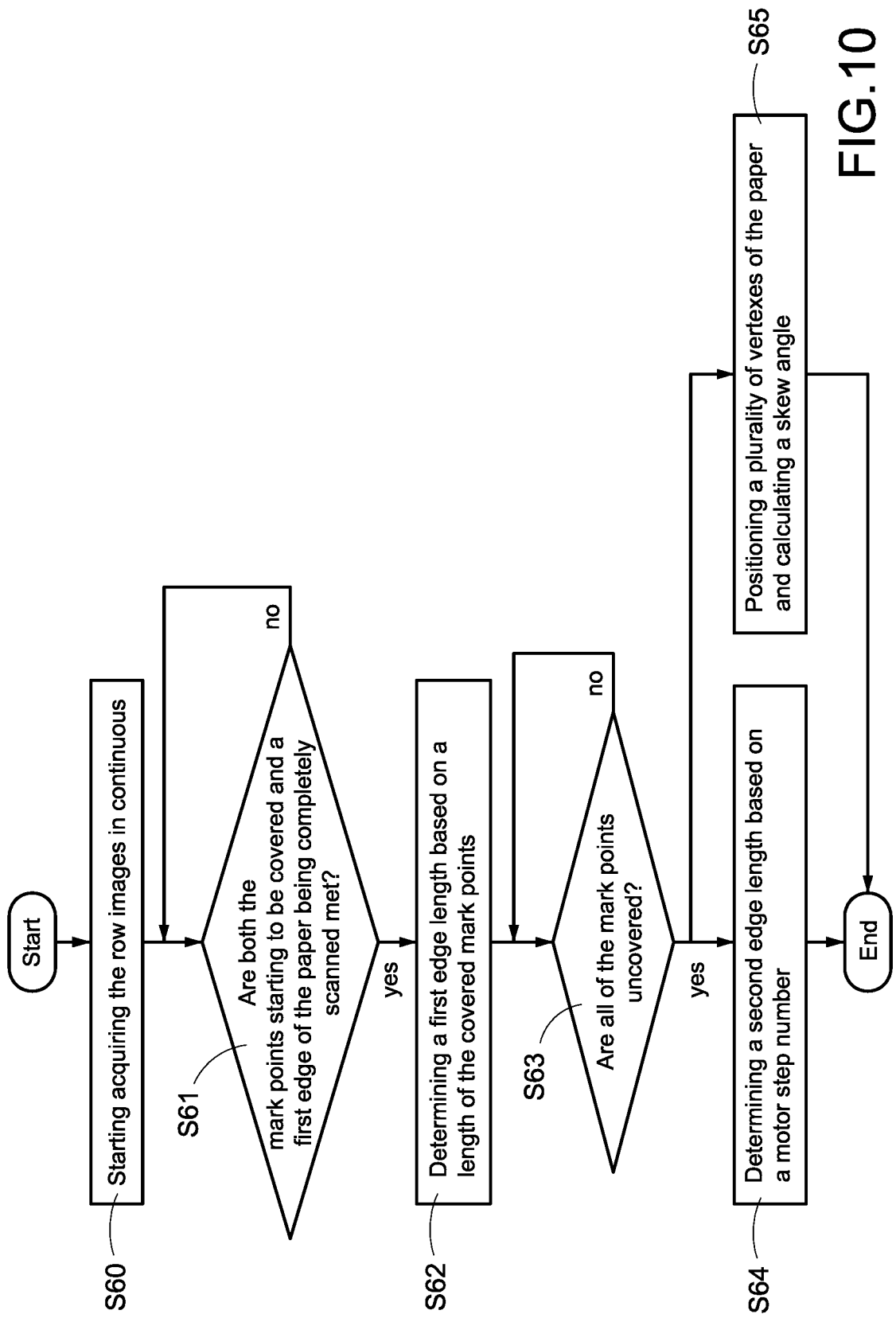
FIG. 10 is a flowchart of real-time detection of one embodiment of the present disclosure.

Please refer to FIGS. 6-10, wherein FIG. 10 is a flowchart of real-time detection of one embodiment of the present disclosure. In the automatic detection method of FIG. 10, the automatic scanning apparatus 1 executes the real-time size detection on the row images continuously obtained to determine the first edge length and the second edge length of the paper (steps S60-S64) for determining the corresponding default size (as shown in FIG. 9), and determines the skew angle of the paper instantly (step S65).

In step S60, the processor 10 controls the image sensor 11 through the scan control module 40 to start sensing (scanning) for acquiring the row images in continuous.

In step S61, the processor 10 determines whether the paper enters the sensing zone (e.g., the mark points start to be covered) through the size detection module 41 during sensing, and determines whether the first edge (e.g., an edge that is parallel or nearly parallel to the paperweight direction) of the paper (the coverage zone) is completely scanned (e.g., the number of covered mark points reaches a maximum).

When the paper enters the sensing zone and the first edge is completely scanned, step S62 is performed. Otherwise, the automatic scanning apparatus continuously scans and performs the step S61 for continuous detection.

In step S62, the processor 10 executes a real-time edge length calculation process either on one row image (if the paper is not skewed) or on more row images (if the paper is skewed) including the two vertexes of the first edge to determine the first edge length of the paper through the size detection module 41. The specific calculation method of the first edge length may be as described above, the relevant description is omitted for brevity.

In step S63, the processor 10 determines whether the paper leaves the sensing zone through the size detection module 41. For example, the processor 10 may determine that the paper leaves the sensing zone when all of the mark points are unveiled from the coverage zone.

When the paper leaves the sensing zone, step S64 is performed. Otherwise, the automatic scanning apparatus 1 continuously scans and performs the step S63 again for continuous detection.

In step S64, the processor 10 may acquire the corresponding motor step number through the scan control module 40 after the sensing for the paper is finished, and then calculate the second edge length of the paper based on the motor step number.

In one of the embodiments, the automatic scanning apparatus 1 may further execute the skew detection on the paper. More specific, in step S65, the processor 10 executes a positioning on the corners (e.g., two corners, three corners, or all of four corners) of the paper and calculates the skew angle based on the corners through the skew detection module 42.

Figure 13:
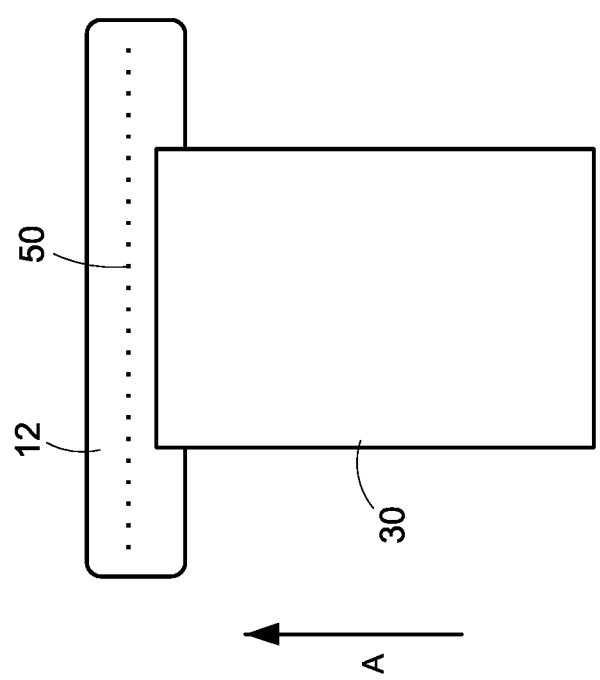
FIG. 13 is a schematic view of feeding and scanning of one embodiment of the present disclosure.
Figure 14:
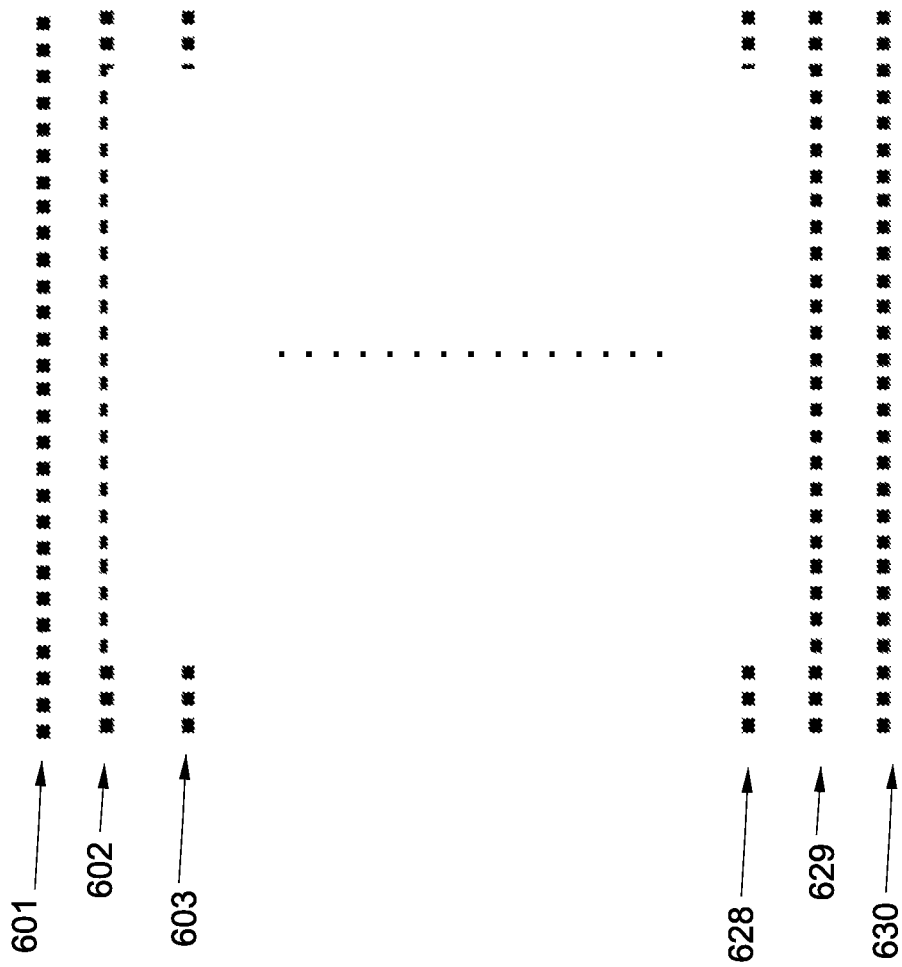
FIG. 14 is a schematic view of multiple row images of one embodiment of the present disclosure.
Figure 15:
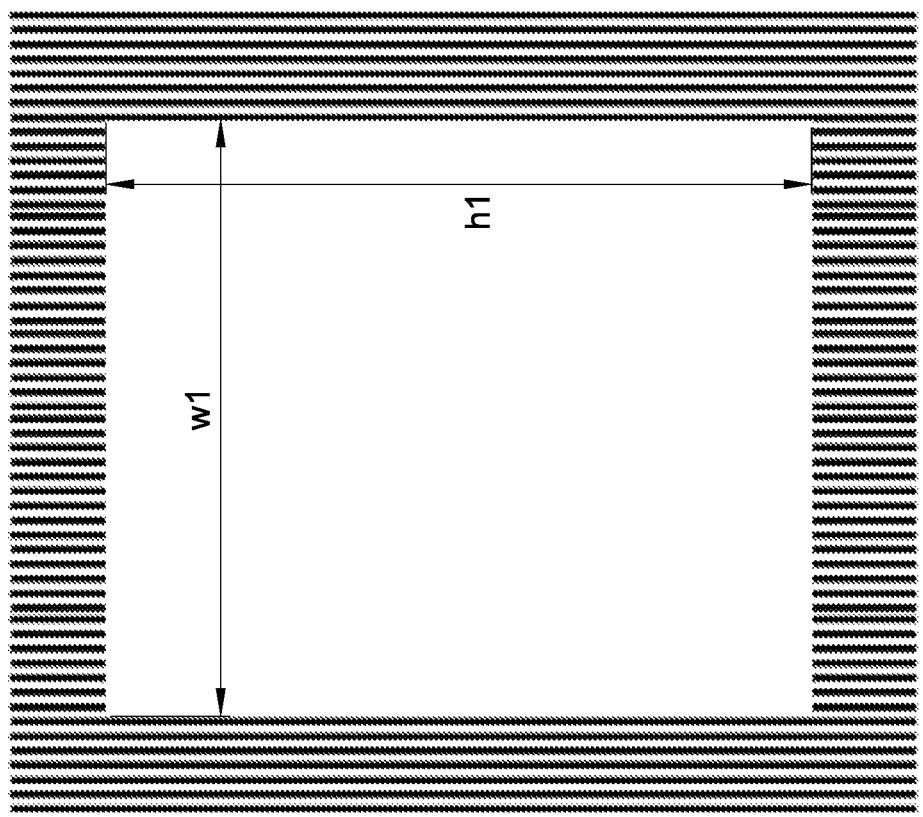
FIG. 15 is a schematic view of images of size detection based on measurement of one embodiment of the present disclosure.
Figure 16:
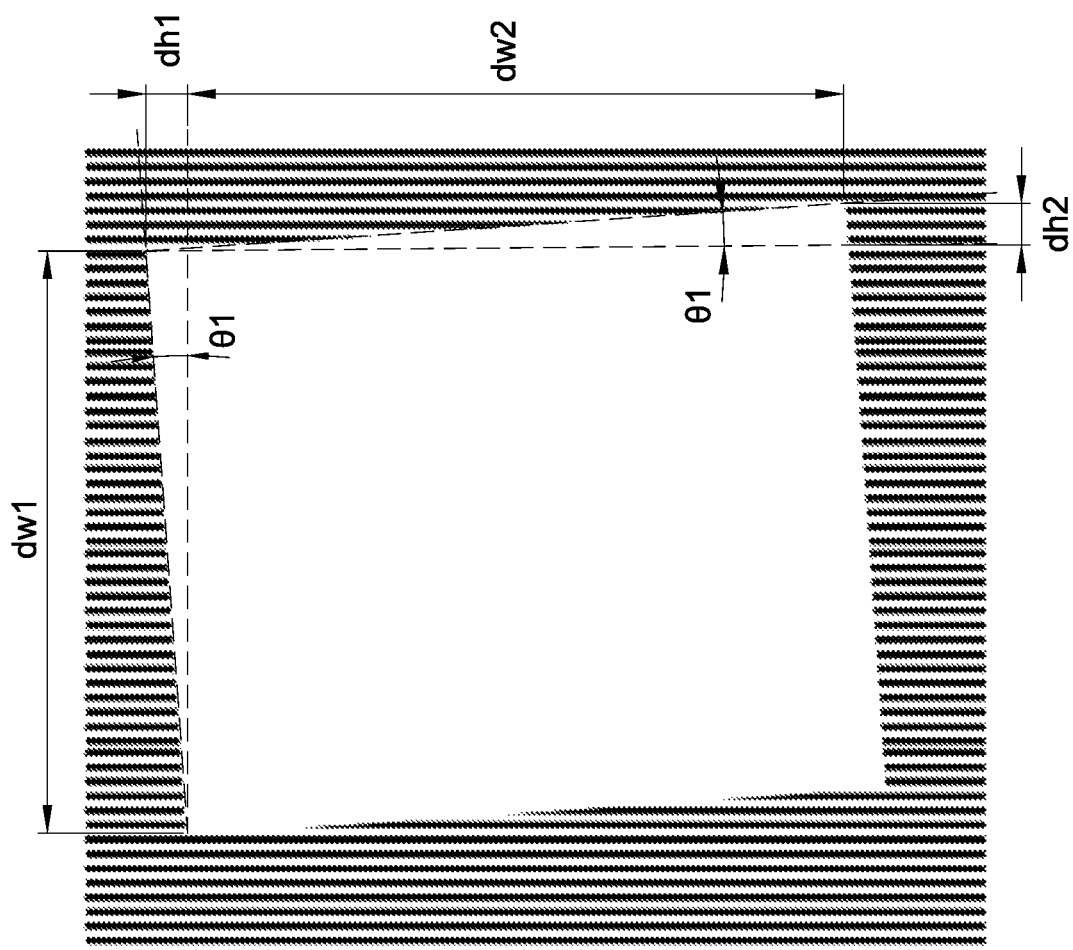
FIG. 16 is a schematic view of images of skew detection based on measurement of one embodiment of the present disclosure.
Figure 17:
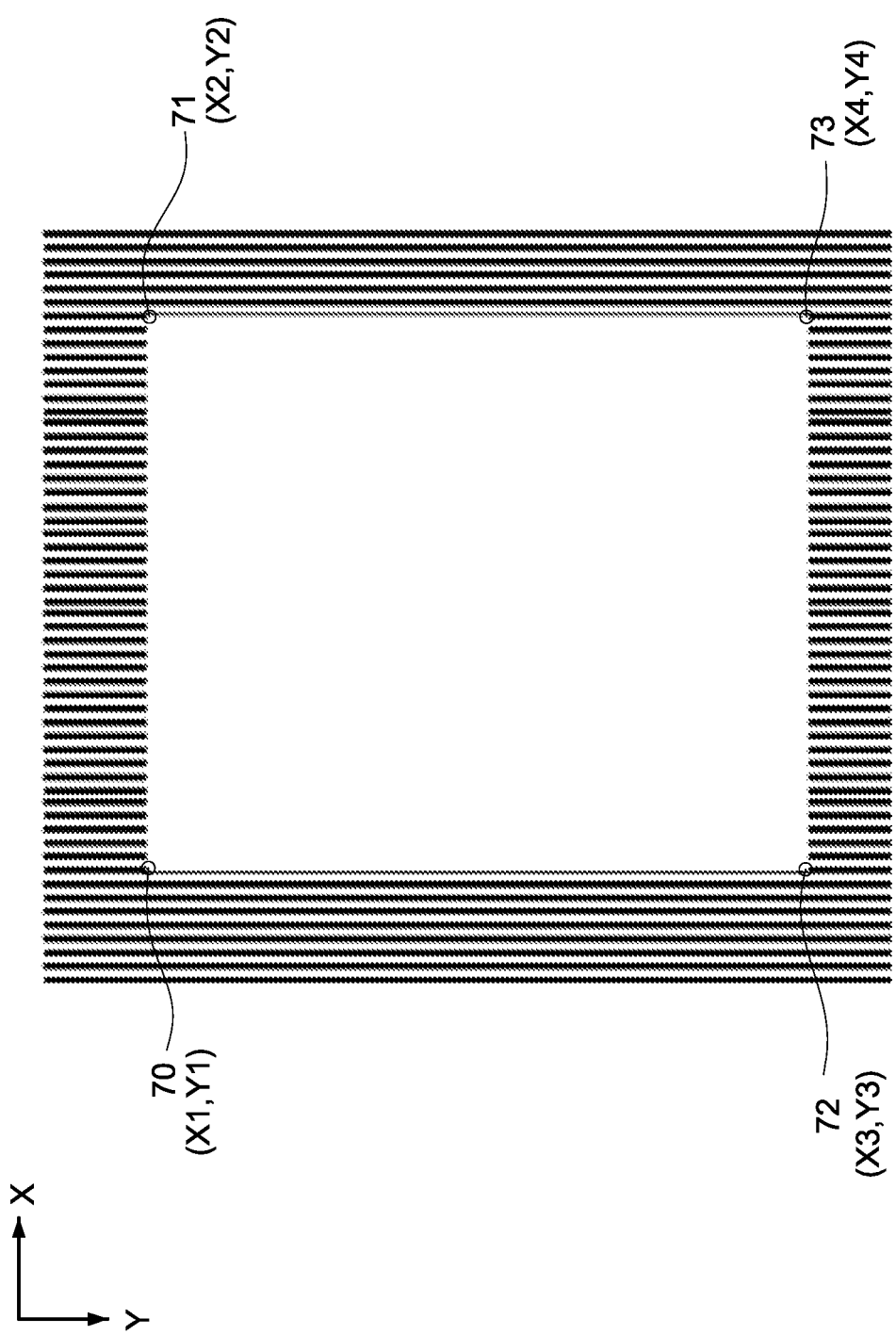
FIG. 17 is a schematic view of images of size detection based on coordinates of one embodiment of the present disclosure.
Figure 18:
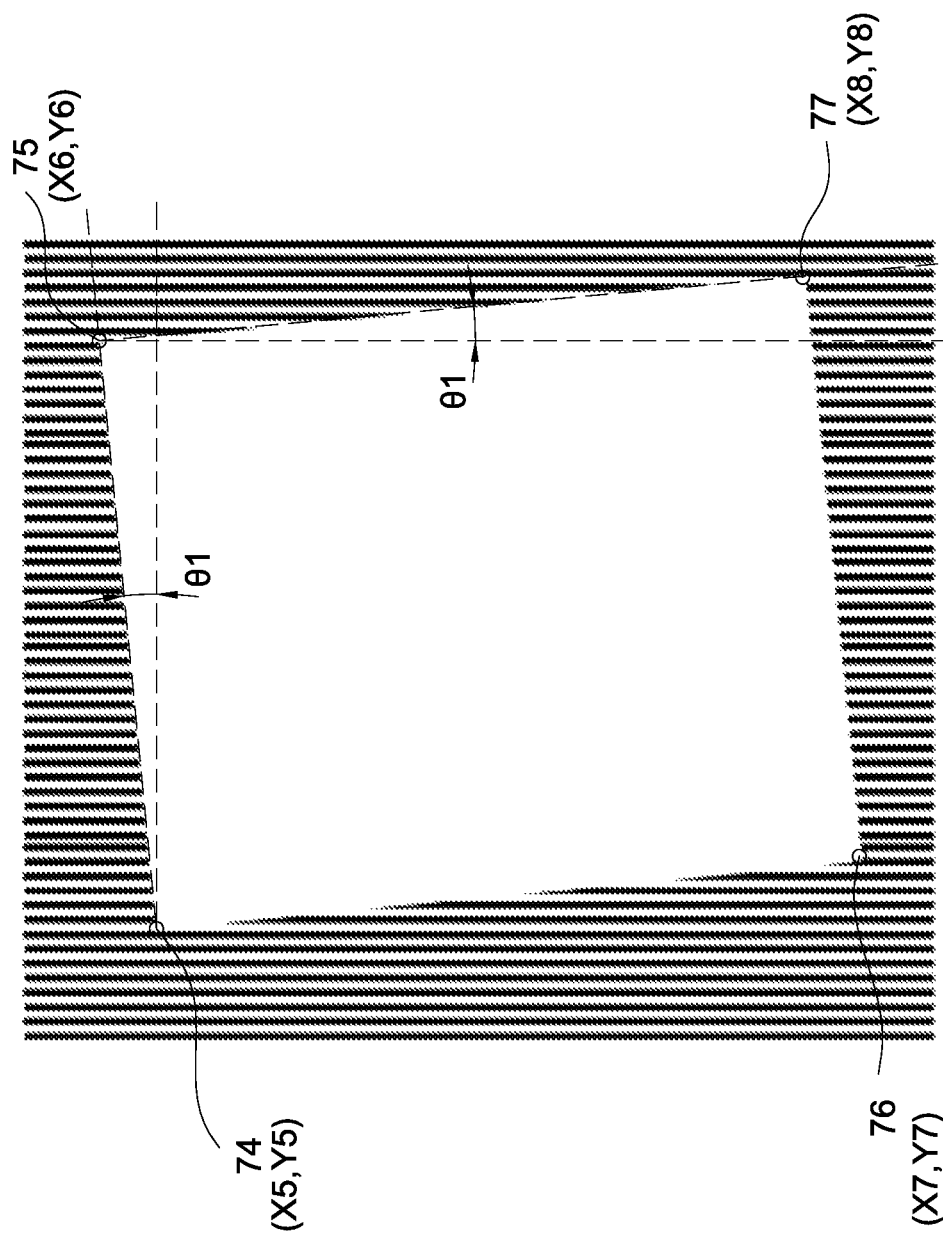
FIG. 18 is a schematic view of images of skew detection based on coordinates of one embodiment of the present disclosure.

Please refer to FIGS. 13-18, wherein FIG. 13 is a schematic view of feeding and scanning of one embodiment of the present disclosure, FIG. 14 is a schematic view of multiple row images of one embodiment of the present disclosure, FIG. 15 is a schematic view of images of size detection based on measurement of one embodiment of the present disclosure, FIG. 16 is a schematic view of images of skew detection based on measurement of one embodiment of the present disclosure, FIG. 17 is a schematic view of images of size detection based on coordinates of one embodiment of the present disclosure, and FIG. 18 is a schematic view of images of skew detection based on coordinates of one embodiment of the present disclosure.

As shown in FIG. 13, the symbol A in FIG. 13 means the feeding direction for the paper 30 to be fed in. The mark line 50 is set on the paperweight 12 in the paperweight direction. The mark line 50 is constituted by the mark points.

As shown in FIG. 14, during scanning, different parts of the paper are passing through the sensing zone in sequence. The image sensor 11 may continuously sense the sensing zone to sequentially obtain multiple row images 601-633 at different timing points.

For example, the motor step number corresponding to scanning the paper 30 is 30 steps. The row image 601 (all of the mark points are not covered) is captured in a first step, the row image 602 (partial mark points start to be covered) is captured in a second step, the row image 603 (partial mark points are covered) is captured in a third step, . . . , the row image 628 (partial mark points are covered) is captured in a 28th step, the row image 629 (the mark points start to be unveiled) is captured in a 29th step, and the row image 630 (all of the mark points are not covered) is captured in a 30th step.

Each of the mark points of the mark line 50 will appear in the scan image as vertical lines because the scan image is obtained by continuous sensing. More specific, the scan image is consisted of the multiple row images 601-630 captured in continuous as shown in FIGS. 15-18. Please refer to FIGS. 14 and 15. When the row image 602 is captured, the processor 10 may determine that the paper has entered to the sensing zone due to the partial mark points being covered. Then the processor 10 may calculate a distance between two mark points that are closest to the two vertexes of the first edge of the coverage zone to obtain a first edge length w1.

When the row image 629 is captured, the processor 10 may determine that the paper has left the sensing zone due to all of the mark points are unveiled. Then the processor 10 may calculate the second edge length h1 based on the motor step number counted during a first time point of capturing the row image 602 and a second time point of capturing the row image 628.

Thus, the present disclosure may detect the edge lengths of the paper instantly.

Please refer to FIGS. 14 and 16. In FIG. 16, the paper has a skew angle 91. When the row image 602 (the second step) and the row image 603 (the third steps) are acquired, the processor 10 may recognize the two vertexes of the first edge, calculate a vertical difference dh1 between the two vertexes (through the difference of the motor step number) and a horizontal difference dw1 (through the mark number between the two vertexes). Moreover, when the row image 629 and the rom image 630 are acquired, the processor 10 may recognize two vertexes of the second edge, and calculate a vertical difference dh2 and a horizontal dw2 between the two vertexes of the second edge.

Then, the processor 10 may calculate the skew angle 91 through trigonometric functions as follows based on the vertical difference dh1 and the horizontal difference dw1.

$$\tan\theta 1 = \frac{dh1}{dw1}$$

$$\theta 1 = \tan^{-1}\left(\frac{dh1}{dw1}\right)$$

In one of the embodiments, the processor 10 may calculate the skew angle 91 through trigonometric functions as follows based on the vertical difference dh2 and the horizontal difference dw2.

$$\tan\theta 1 = \frac{dh2}{dw2}$$

$$\theta 1 = \tan^{-1}\left(\frac{dh2}{dw2}\right)$$

The processor 10 may calculate the first edge length w1 and the second edge length h1 through the following formulas when the skew angle 91 is acquired.

$$\cos\theta 1 = \frac{dw1}{w1} = \frac{dw2}{h1}$$

$$\sin\theta 1 = \frac{dh1}{w1} = \frac{dh2}{h1}$$

$$w1 = \frac{dw1}{\cos\theta 1} = \frac{dh1}{\sin\theta 1}$$

$$h1 = \frac{dw2}{\cos\theta 1} = \frac{dh2}{\sin\theta 1}$$

Please refer to FIGS. 14 and 17, wherein FIGS. 14 and 17 are used to illustrate the coordinate positioning. During scanning, the processor 10 may recognize four vertexes 70-73 of the coverage zone in the row images when the row image 602 and the row image 629 are captured. Then the processor 10 may execute the coordinate positioning on the four vertexes to obtain the coordinates of (X1, Y1), (X2, Y2), (X3, Y3), and (X4, Y4) correspondingly.

Next, the processor 10 may calculate a distance between the vertex 70 and the vertex 71 or a distance between the vertex 72 and the vertex 73 as the first edge length. Moreover, the processor 10 may calculate a distance between the vertex 70 and the vertex 72 or a distance between the vertex 71 and the vertex 73 as the second edge length.

Please refer to FIGS. 14 and 18. In FIG. 18, the paper has the skew angle 91. The processor 10 may recognize four vertexes 74-77 closest to the coverage zone respectively in the row images 602, 603, 629, and 630, and execute the coordinate positioning on the four vertexes to obtain the coordinates of (X5, Y5), (X6, Y6), (X7, Y7), and (X8, Y8) correspondingly.

Next, the processor 10 may calculate a distance between the vertex 74 and the vertex 75 or a distance between the vertex 76 and the vertex 77 as the first edge length. Moreover, the processor 10 may calculate a distance between the vertex 74 and the vertex 76 or a distance between the vertex 75 and the vertex 77 as the second edge length. Moreover, the processor may calculate the skew angle 91 based on the coordinates and the above-mentioned trigonometric functions.

Figure 11:
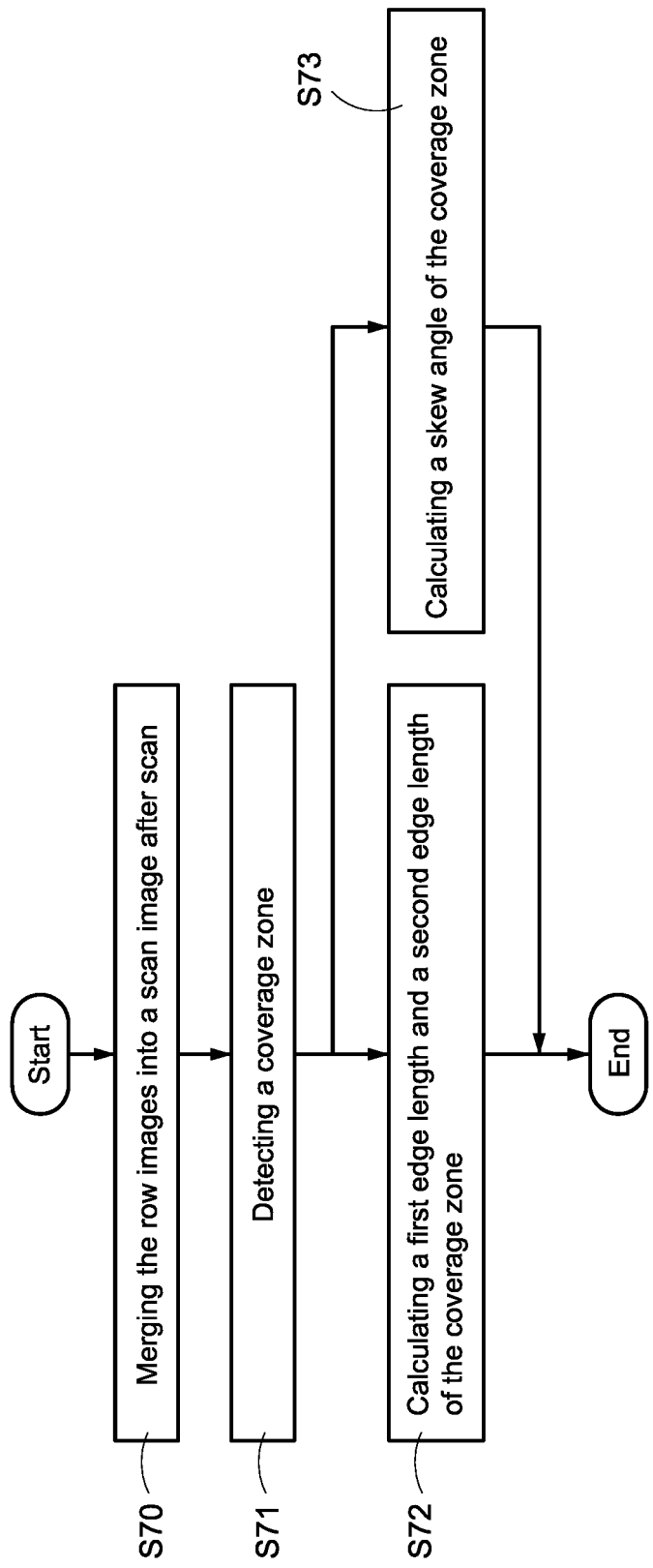
FIG. 11 is a flowchart of after-scan detection of one embodiment of the present disclosure.

Please refer to FIGS. 6-11, wherein FIG. 11 is a flowchart of after-scan detection of one embodiment of the present disclosure. In the automatic detection method of FIG. 11, the processor 10 splices all the row images into the scan image after the scanning is completed, and executes the size detection to determine the first edge length and the second edge length of the paper (steps S70-S72) for determining the corresponding default size (as shown in FIG. 9). Moreover, the processor 10 may determine the skew angle of the paper (step S73).

In step S70, the processor 10 merges the row images (as shown in FIG. 14) into the scan image (as shown in FIG. 15) through the scan control module 40.

In step S71, the processor 10 recognizes the coverage zone of the paper (namely, the corresponding area of the paper) in the scan image through the size detection module 41 based on the mark points being covered in the scan image.

In step S72, the processor 10 executes an after-scan edge length calculation process on the coverage zone of the scan image to determine the first edge length and the second edge length of the paper through the size detection module 41.

In one of the embodiments, the processor 10 may calculate a length of a connection of the two vertexes as the first edge length based on the mark number between the two vertexes of the top edge or the bottom edge of the coverage zone, or calculate the second edge length based on the motor step number corresponding to the two vertexes of the side edge of the coverage zone.

In one of the embodiments, the process 10 may execute the coordinate positioning on the vertexes of the top edge, the side edge, or the bottom edge of the coverage zone to obtain the coordinates of the vertexes, and configure the distance between the coordinates of the vertexes as the first edge length (of the tope edge or the bottom edge) or the second edge length (of the side edge).

In one of the embodiments, the processor may further execute the skew detection (step S73). In step S73, the processor 10 calculates the skew angle of the coverage zone through the size detection module 41.

Please refer to FIGS. 13 and 15-18. As shown in FIG. 15, the processor 10 may recognize the four vertexes of the coverage zone (e.g., recognizing four mark points that are closest to the four vertexes) in the scan image, and calculate a first edge length w1 and a second edge length h1 based on the mark number among the four vertexes and the motor step number.

As shown in FIG. 16, the paper has a skew angle θ1. The processor 10 may recognize the four vertexes of the coverage zone in the scan image, calculate a vertical difference dh1 (or dh2) and a horizontal difference dw1 (or dw2) based on the mark number among the four vertexes and the motor step number, and calculate the skew angle θ1, the first edge length w1 and the second edge length h1 based on the trigonometric functions.

As shown in FIG. 17, wherein FIG. 17 is used to illustrate the coordinate positioning. When the scanning is completed, the processor 10 may recognize the four vertexes 70-73 of the coverage zone in the scan image, and execute the coordinate positioning on the four vertexes (mark points) to obtain the coordinates of (X1, Y1), (X2, Y2), (X3, Y3), and (X4, Y4) correspondingly.

Next, the processor 10 may directly calculate a distance between the vertex 70 and the vertex 71 or a distance between the vertex 72 and the vertex 73 based on the coordinates to be the first edge length, and calculate a distance between the vertex 70 and the vertex 72 or a distance between the vertex 71 and the vertex 73 based on the coordinates to be the second edge length.

As shown in FIG. 18, the paper has a skew angle θ1. The processor 10 may recognize the four vertexes 74-77 of the coverage zone in the scan image, and execute the coordinate positioning on the four vertexes (mark points) to obtain the coordinates of (X5, Y5), (X6, Y6), (X7, Y7), and (X8, Y8) correspondingly.

Next, the processor 10 may directly calculate a distance between the vertex 74 and the vertex 75 or a distance between the vertex 76 and the vertex 77 based on the coordinates to be the first edge length, and calculate a distance between the vertex 74 and the vertex 76 or a distance between the vertex 75 and the vertex 77 based on the coordinates to be the second edge length. Moreover, the processor 10 may calculate the skew angle θ1 based on the coordinates and the above-mentioned trigonometric functions.

Thus, no matter the paper is skewed or not, the present disclosure may accurately calculate the first edge length and second edge length of the paper, and accurately detect the paper size of the paper.

While this disclosure has been described by means of specific embodiments, numerous modifications and variations could be made thereto by those skilled in the art without departing from the scope and spirit of this disclosure set forth in the claims.

What is claimed is:

1. An automatic detection method for a paper size, a plurality of mark points being set on a paperweight along a paperweight direction different from a feeding direction, the method comprising:

a) acquiring a scan image comprising a plurality of row images in continuous by controlling an image sensor to continuously sense the mark points of the paperweight during a paper passing between the paperweight and the image sensor;

b) determining a first edge length of the paper based on a coverage zone of the paper covering the mark points in the row images; and c) determining the paper size of the paper based on the first edge length.

2. The automatic detection method for a paper size of claim 1, wherein the step a) comprises:

a1) controlling the image sensor to start sensing when a page feed-in sensor is triggered; and a2) controlling the image sensor to stop sensing when a page feed-out sensor is triggered.

3. The automatic detection method for a paper size of claim 1, wherein the step a) comprises:

a3) controlling the image sensor to start sensing when a sensing condition is met; and a4) controlling the image sensor to stop sensing when all of the mark points shown in the row image are uncovered.

4. The automatic detection method for a paper size of claim 1, further comprising a step before the step c):

d) determining a second edge length of the paper based on a motor step number corresponding to the coverage zone;

wherein the step c) comprises:

c1) selecting one of a plurality of default sizes as the paper size of the paper based on the first edge length and the second edge length.

5. The automatic detection method for a paper size of claim 4, wherein the step b) comprises:

b1) executing a real-time edge length calculation process on at least one of the row images showing multiple vertexes of an edge of the coverage zone to determine the first edge length of the paper when the mark points begin to be covered and the edge of the coverage zone is completely scanned.

6. The automatic detection method for a paper size of claim 5, wherein the real-time edge length calculation process comprises:

e1) recognizing a mark number of the mark points between the vertexes of the edge; and e2) calculating a connection length of the vertexes to be the first edge length based on a mark interval and the mark number.

7. The automatic detection method for a paper size of claim 5, wherein the real-time edge length calculation process comprises:

f1) executing a coordinate positioning on the vertexes of the edge to obtain coordinates of the multiple vertexes; and f2) calculating a distance between the coordinates of the vertexes to be the first edge length;

wherein the coordinate positioning comprises: determining a first axis coordinate corresponding to the paperweight direction based on a mark interval and a mark number of the mark points between the vertexes.

8. The automatic detection method for a paper size of claim 4, wherein the step b) comprises:

b2) executing an after-scan edge length calculation process on the coverage zone of the scan image to determine the first edge length of the paper when the sensing of the image sensor is finished.

9. The automatic detection method for a paper size of claim 8, wherein the after-scan edge length calculation process comprises:
- g1) recognizing a mark number of the mark points between multiple vertexes of a top edge or a bottom edge of the coverage zone; and
- g2) calculating a connection length of the vertexes to be the first edge length based on a mark interval and the mark number.

10. The automatic detection method for a paper size of claim 8, further comprising:
- h1) execute a coordinate positioning on the vertexes of a top edge or a bottom edge of the coverage zone to obtain coordinates of the multiple vertexes; and
- h2) calculating a distance between the coordinates of the vertexes to be the first edge length based on the coordinates of the multiple vertexes;
- wherein the coordinate positioning comprises: determining a first axis coordinate corresponding to the paperweight direction based on a mark interval and a mark number of the mark points between the vertexes.

11. The automatic detection method for a paper size of claim 4, wherein the step d) comprises:
- d1) acquiring a motor step number of a motor of a paper feeding device, wherein the motor step number is counted during the mark points are covered by the paper; and
- d2) calculating a second edge length based on the motor step number and a conversion ratio.

12. The automatic detection method for a paper size of claim 4, wherein the step d) comprises:
- d3) executing a coordinate positioning on multiple vertexes of any side edge of the coverage zone to obtain coordinates of the multiple vertexes; and
- d4) calculating a distance between the coordinates of the vertexes to be the second edge length;
- wherein the coordinate positioning comprises: determining a second axis coordinate corresponding to the feeding direction based on the motor step number and a conversion ratio.

13. The automatic detection method for a paper size of claim 1, further comprising:
- i1) executing a skew detection process on the coverage zone shown in the scan image to determine a skew angle of the paper with respect to the feeding direction or the paperweight direction; and
- i2) correcting an orientation of the scan image based on the skew angle.

14. The automatic detection method for a paper size of claim 13, wherein the skew detection process comprises:
- j1) executing a coordinate positioning on multiple vertexes of the coverage zone to obtain coordinates of the multiple vertexes; and
- j2) calculating the skew angle of a connection of the multiple vertexes and one of the feeding direction and the paperweight direction based on the coordinates.

15. The automatic detection method for a paper size of claim 13, wherein the skew detection process comprises:
- k1) recognizing multiple vertexes of a top edge, a bottom edge, or a side edge of the coverage zone;
- k2) calculating a first offset of the multiple vertexes in the feeding direction and a second offset of the multiple vertexes in the paperweight direction; and
- k3) calculating the skew angle of a connection of the multiple vertexes and one of the feeding direction and the paperweight direction based on the first offset and the second offset.

16. The automatic detection method for a paper size of claim 1, wherein each mark interval of each two adjacent mark points of the multiple mark points in the paperweight direction is identical, and the mark interval is less than each difference of two default edge lengths of a plurality of default sizes.

17. The automatic detection method for a paper size of claim 1, wherein the mark points form a dotted line.

18. The automatic detection method for a paper size of claim 1, wherein a length of the mark points is greater than any default edge length of a plurality of default sizes.

19. The automatic detection method for a paper size of claim 1, further comprising:
- l1) feeding a print paper into a printing device from one of paper trays based on the paper size, wherein each of the paper trays is respectively corresponding to different default size; and
- l2) controlling the printing device to print the scan image on the print paper.

\* \* \* \* \*